Jan. 16, 1962 C. MALMSTROM ETAL 3,016,948
OIL REGULATOR
Filed Nov. 12, 1957
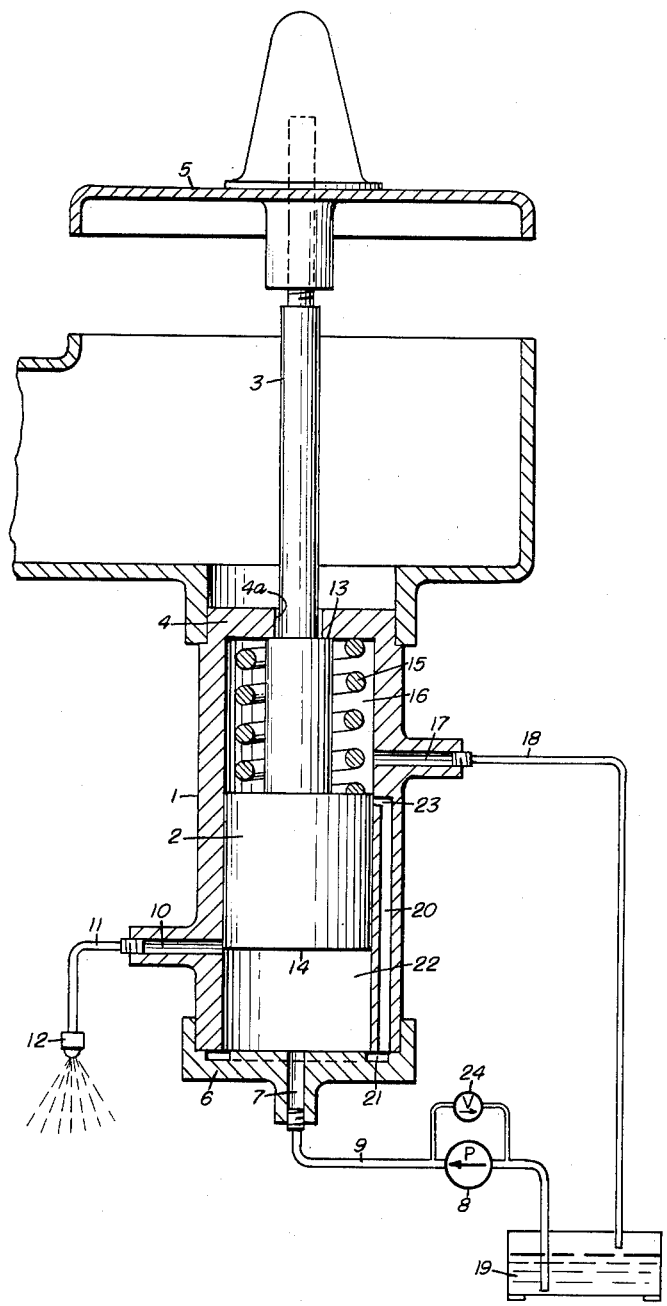
INVENTORS
**P. MALMSTROM
B.O.M. PALM**
ATTORNEYS 3,016,948
OIL REGULATOR
Carl Malmström and Björn Olof Magnus Palm, both of
P.O. Box 631, Norrkoping, Sweden
Filed Nov. 12, 1957, Ser. No. 695,609
Claims priority, application Sweden Nov. 10, 1956
2 Claims. (Cl. 158—36.3)

In the case of oil pipe units it is known to fit into the pipe from the oil pump to the mouth piece of the burner a combustion air valve acted upon by a piston servo motor with oil inlet in the cover and an outlet for the oil in the jacket surface, which outlet is so disposed that it is kept closed by the spring loaded piston of the servo motor as soon as the air valve is not wholly open.

It is also known to provide the piston of the servo motor with a through-flow bore, the area of which is considerably less than that of the inlet so that, when the oil supply from the pump is stopped, it is made possible for the piston to be pressed back by the spring and to close the air valve, whereby the oil situated behind the piston passes through the bore to the upper side of the piston.

This last named arrangement suffers from the disadvantage that the chamber on the upper side of the piston comes to be filled with oil, which at the movement of the piston under the influence of the oil pressure comes to be pressed out through the mouth piece before the air valve can be opened, owing to which there is a risk for the formation of explosive air-oil mixtures.

It is also known to dispose an aperture, which has a considerably less area than the pressure pipe, at the bottom of the cylinder or on the pressure pipe of the pump, which aperture is connected with the oil tank through a return pipe.

This last arrangement operates well as soon as the aperture to the return pipe is correctly sized in relation to the spring, that is pressing the piston back. However, it is necessary that this sizing is very accurate and requires that a special fine adjusting valve is disposed in the aperture. It also presupposes that the oil pump is oversized, as oil in the firing periods continuously streams out through the aperture.

The present invention relates to an arrangement for oil firing sets, which generally removes these disadvantages.

The arrangement comprises an hydraulic piston servo motor, having a cylinder, an inlet at one end of the cylinder, an oil pump, a pressure pipe connecting the oil pump with the inlet, a piston in said cylinder, a spring biasing the piston towards said inlet end, a valve for combustion air, and a piston rod slidable through a hole in the other end of the cylinder and engageable with the air valve to open and close this, a burner mouthpiece, an aperture connecting the burner mouthpiece with the interior of the cylinder and spaced from said inlet end a distance less than the length of the piston and a little less than the stroke of the piston, a channel in the wall of the cylinder of lesser area than the pressure pipe and inlet and opening into the cylinder at one end adjacent said inlet end and its other end at a distance from the inlet end a little less than the length of the piston added to the stroke of the piston, and an aperture spaced at a distance from the inlet end greater than the length of the piston added to the stroke of the piston connecting the interior of the cylinder on the piston rod side of the piston with the oil tank.

One embodiment of the invention is shown on the attached drawing, which is seen in longitudinal section.

A piston 2 is fitted slidingly and sealingly in a cylinder 1. The piston 2 is provided with a piston rod 3, which passes through a hole 4a in a cylinder head 4, placed in the cylinder 1 and arranged so as to act on a valve 5 for the combustion air in such a manner that the air valve 5 is opened when the piston 2 is moved towards the cylinder head 4, and is closed when it is moved in the opposite direction. In the opposite head 6 of the cylinder 1 there is disposed an inflow aperture 7, which is connected to the fuel oil pump 8 through a pressure pipe 9.

The piston rod 3 is provided with a shoulder 13 at such a distance from the under side 14 of the piston 2 that the shoulder 13 contacts the cylinder head 4, when the under side 14 of the piston 2 is at the rim of the aperture 10 nearest the cylinder head 4. The aperture outlet means 10 is connected to a burner mouthpiece 12 through a pipe 11. There is placed between the cylinder head 4 and the piston 2 a pressure spring 15. The cylinder space 16 on the piston rod side of the piston 2 is connected by an aperture outlet means 17 and through a pipe 18, with the fuel oil container 19.

In the jacket of the cylinder 1 there is disposed a longitudinal channel 20. One end of this channel 20 is connected with the space 22 on the inlet side of the piston 2, through an aperture 21 near the inlet head 6 of the cylinder 1, and the other end of the channel 20 is connected with the space 16 on the piston rod side of the cylinder 1 through an aperture 23. The channel 20 is contracted, at the aperture 21, to a substantially less area than the area of the pressure pipe 9 and of the aperture 7. The aperture 23 is disposed in such distance from the cylinder head 4, that it will be completely closed by the piston 2, when the shoulder 13 contacts the cylinder head 4 and the air valve 5 is completely opened.

The arrangement works in the following manner:

When the fuel oil pump 8 starts, the piston 2 is situated in its bottom position and keeps the valve 5 for the combustion air closed, so that no cold air passes through it. The connection aperture 10 between the fuel oil pump 7 and the burner mouthpiece 12 is closed by the piston 2. When the pump 8 starts, it presses oil into the cylinder 1 through the aperture 7, whereupon the piston is pressed against the pressure of the spring 15 upwards towards the cylinder head 4. In this manner the piston rod 3 first acts on the valve 5 so that the latter is opened and air flushes through the space around the mouthpiece 12. When the air valve 5 is fully opened, the piston 2 opens the connection aperture 10 between the pump 8 and the burner mouthpiece 12 and the combustion starts. The capacity of the pump 8 must be so great that a part of the oil always passes through a by-pass valve 24 disposed in or on the pump 8 adjusted for the desired oil pressure.

When the pump 8 stops, the piston 2 is pressed back by the spring 15 against the head 6 of the cylinder space 22, oil in the cylinder 1 leaving through the channel 20 to the cylinder space 16. At this the piston 2 first closes the aperture 10 to the burner mouthpiece 12 and simultaneously opens the aperture 23 and the piston rod 3 closes the air valve 5.

Although only one form of embodiment has been shown and described above, others can also occur within the scope of the invention.

What is claimed is:

1. An arrangement for an oil firing set comprising a cylinder having heads at opposite ends thereof, one of said heads having an inlet therein and the opposite head having a hole therein, an oil tank, an oil pump connected to the tank, conduit means connecting said oil pump with said inlet, a piston in said cylinder, spring means biasing said piston towards the head of the cylinder having the inlet, valve means for combustion air, a piston rod connected to said piston slidable through said hole and engageable with the valve means for opening and closing said valve means, a burner mouthpiece, a first outlet means connecting the burner mouthpiece with the interior of said cylinder, said first outlet means being spaced from the head of the cylinder having said inlet a distance less than the length of said piston and slightly less than the stroke of said piston, means defining a longitudinally extending channel in the interior of said cylinder of lesser area than that of said inlet, said channel having opposite open ends, one end of said channel being in communication with the cylinder adjacent said head having the inlet and the other end of said channel being at a distance from the head of the cylinder having the inlet slightly less than the length of the piston plus the stroke of the piston, said other end of the channel being spaced from said first outlet means a distance slightly less than the length of the piston, a second outlet means for said cylinder spaced a distance from the head of the cylinder having the inlet a distance greater than the length of the piston plus the stroke of the piston in communication with the interior of the cylinder on the piston rod side of the piston, and conduit means connecting said second outlet means with said oil tank so that when the pump means is inoperative, said spring means urges the piston in the direction of the head of the cylinder having the inlet thus closing said first outlet means and opening the other end of said channel so that oil below the piston may be forced through said channel to the piston rod side of the piston through said second outlet means and conduit means to the oil tank.

2. The arrangement as claimed in claim 1, in which said piston has an underside, a shoulder provided on said piston rod at a distance from the underside of said piston such that said shoulder abuts against the opposite head when the underside of said piston opens said first outlet means.

References Cited in the file of this patent

UNITED STATES PATENTS

| | | |
|---|---|---|
| 2,405,888 | Holley | Aug. 13, 1946 |
| 2,408,836 | Warner | Oct. 8, 1946 |
| 2,579,147 | Ifield | Dec. 18, 1951 |
| 2,592,132 | Feilden et al. | Apr. 8, 1952 |
| 2,688,337 | Shivers | Sept. 7, 1954 |

FOREIGN PATENTS

| | | |
|---|---|---|
| 670,187 | Great Britain | Apr. 16, 1952 |